March 21, 1961 W. H. MOORE ET AL 2,976,483

GRADIOMETER FOR UNDERWATER MISSILE WARHEAD

Filed Nov. 30, 1956

Inventors
W. H. MOORE
D. P. BURCHAM

By
*(signature)*
Attorneys 2,976,483

GRADIOMETER FOR UNDERWATER MISSILE WARHEAD

William H. Moore, Upton, N.Y., and Donald P. Burcham, Kensington, Md., assignors, by mesne assignments, to the United States of America as represented by the Secretary of the Navy Filed Nov. 30, 1956, Ser. No. 625,563

5 Claims. (Cl. 324—43)

This invention relates to a magnetic exploder device for underwater ordnance applications, such as torpedoes and mines, and more particularly to a new and improved gradiometer unit for use in the warhead of an underwater ordnance missile.

More specifically, the invention provides a device adapted to measure small gradients in magnetic fields and to detect the approach of, or to, magnetic objects, such as, by way of example, a submarine, and to develop a corresponding potential signal. Additionally, the invention provides a device which is adapted to be rotated in a uniform magnetic field such, for example, as the terrestrial field of the earth without developing any appreciable voltage when no magnetic object is disposed within the vicinity of the device.

Unlike devices of this character hereinbefore proposed, such, for example, as that disclosed in the co-pending application of Edward S. Gilfillan, Jr., et al., Serial Number 416,742, filed Oct. 27, 1941, and now abandoned, wherein the difficulty in obtaining magnetic balance of the detecting elements resulted in greatly reduced operational utility, the device of the present invention while possessing all the advantages of the heretofore utilized devices overcomes the many balancing shortcomings thereof.

Accordingly, one object of the present invention is to provide a new and improved apparatus unresponsive to motions thereof in the earth's magnetic field and which is responsive to the approach of, or to, magnetic objects.

Another object of the present invention is to provide a new and improved gradiometer apparatus adaptable to be more readily magnetically balanced than heretofore devised.

A further object of the present invention is to provide a more sensitive gradiometer device for magnetic influence exploders.

Other objects and many of the attendant advantages of the present invention will be readily appreciated as the same becomes better understood by reference to the following detailed description when considered in connection with the accompanying drawings wherein.

Figure 6:
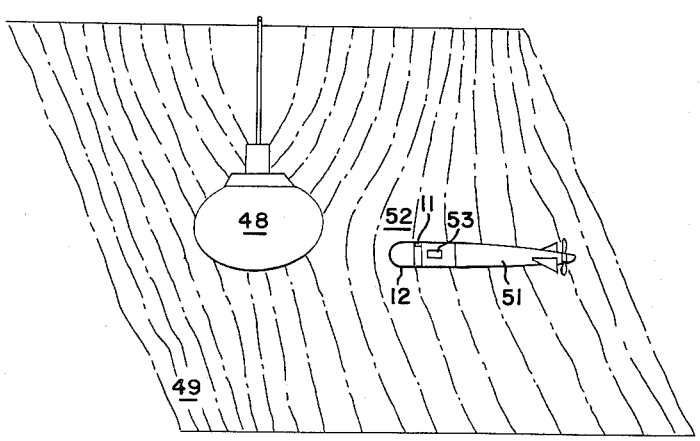

Fig. 6 diagrammatically illustrates the distortional effect of a submarine upon the earth's magnetic field within the vicinity of the inventive device.

Figure 1:
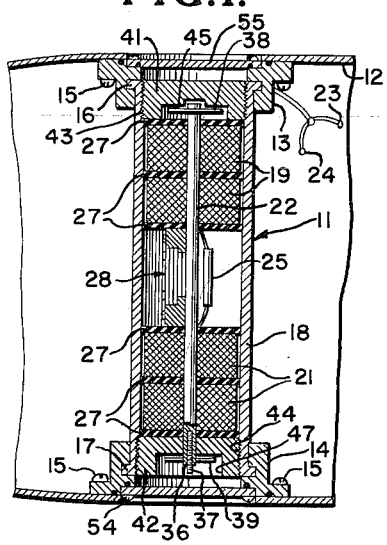
Fig. 1 is a view in elevation, partially in section and partially broken away, of the present inventive apparatus arranged in a warhead.
Figure 2:
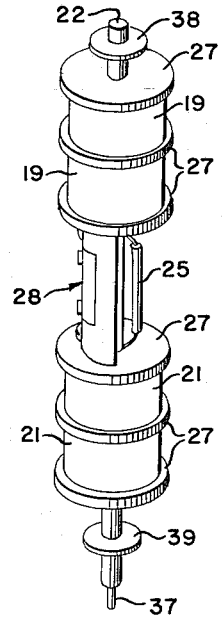
Fig. 2 is a somewhat more detailed view of the internal arrangement of the apparatus of Fig. 1.
Figure 3:
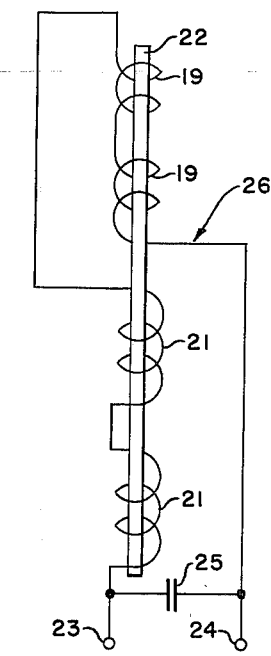
Fig. 3 illustrates, in schematic form, the circuit arrangement of the present inventive apparatus.
Figure 4:
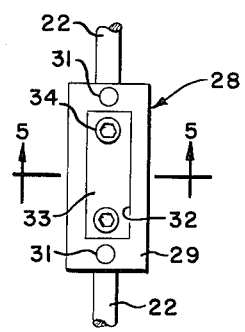
Fig. 4 is a view, somewhat enlarged, of the centrally disposed corrector device of the present inventive apparatus.
Figure 5:
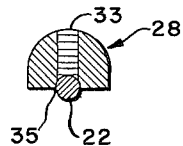
Fig. 5 is a view in section taken along the line 5—5 of Fig. 4.

Referring now to the drawings wherein like reference numerals indicate like parts throughout the several views and more particularly to Figs. 1 and 2 thereof, there is shown thereon a gradiometer device indicated generally by the numeral 11 mounted transverse of the horizontal axes of an underwater ordnance missile such as a torpedo, or submarine launched mine, warhead 12 by means of mounting brackets 13 and 14. Brackets 13 and 14 are secured to the non-magnetic warhead 12 such as, by way of example, plastic or brass, by any suitable means, such as bolts 15, and having a groove 16 for engaging the collar 17 of the gradiometer casing, or tube, 18. Arranged within the tube 18 are a pair of detecting, or induction, coils 19 and 21, which coils are shown, by way of example, and not limitation, as being wound in two serially connected sections on either end of a magnetic core, or rod, 22, which core is composed of a ferromagnetic material having a high permeability such, for example, as Permalloy or Hypernik. Each coil consists of substantially the same number of turns, wound in two sections, and connected in series opposition, as shown in Fig. 3, for producing a net output potential signal at terminals 23 and 24 when a difference between the time rate of change of the flux linking the coils exists, as will be more fully described. The detecting coils 19 and 21 are shunted by a filter capacitor 25 for tuning the detecting coil circuit 26 to be responsive to a low frequency of, by way of example, and not limitation, 3 c.p.s. Secured to rod 22 are spacers 27, preferably of a non-magnetic material, between which the detecting coils are disposed. Centrally mounted on the core 22 is a copper and iron corrector device, generally indicated by the reference numeral 28, the purpose of which will be explained hereinafter. As more clearly shown in Figs. 4 and 5, the corrector device 28 consists of a block of electrically conductive material 29, preferably copper, secured to the rod 22 by means of bolts 31 and having an aperture 32 centrally formed thereon. Aperture 32 is provided for reception of soft iron sheets or plates, 33, which are secured within the recess 32 by means of retaining bolts 34. In order to insure a more firm attachment, or contact, with core 22, a conforming groove, or channel, 35 is formed in block 29. At one end of core 22 there is provided a tapped hole 36 wherein a threaded ferromagnetic rod, or screw 37 is disposed for varying the effective magnetic length of the core 22. Permanently installed at one end of rod 21 is a copper disc 38, while at the other end of the rod 21 provision is made for the installation of a variable number or width, copper discs 39, for providing means for amplitude adjustment of the signal generated by coils 19 and 21. The rod 22 is secured within the casing 18 by means of end caps 41 and 42 which are adapted to threadedly engage casing 18 at 43 and 44. A recess 45 is provided in end cap 41 for maintaining the rod 21 in fixed space relationship within casing 18 and for disposition of the disc 38. In like manner, end cap 42 has a bore 46 therethrough and an enlarged recessed portion 47 formed coaxially with the bore 46 wherein the disc correctors 39 are disposed.

Fig. 6 illustrates the effect of the presence of a ferromagnetic body, such as the submarine 48 illustrated, upon the terrestrial magnetic field, indicated by the broken lines 49, and its consequent effect on an underwater missile 51 having a gradiometer unit 11 of the present inventive type vertically disposed in the warhead 12 thereof.

As is well known, the terrestrial magnetic field comprises lines of force which are perpendicular to the surface of the earth at the poles and, in general, are parallel to the earth's surface at the magnetic equator, the angle of inclination of the magnetic field with the earth's surface increasing with an increase of magnetic latitude. As indicated in Fig. 6 the lines of force forming a portion of the earth's magnetic field 49 at some distance from any ferromagnetic object are substantially parallel to each other. In this region, the flux linkages of coils 19 and 21 are equal and the potential generated in each coil is of the same magnitude. Theoretically, inasmuch as the coils are connected in series opposition, no output signal will appear at terminals 23 and 24. However, as indicated at 52, the lines of force are curved or deflected by the proximity of a ferromagnetic body 48, so that the direction of the lines of force passing through the missile 51 is varied sufficiently to cause the flux linkages of the coil 19 with the magnetic field to be different than the flux linkages of the coil 21 with the field. Consequently, as the missile 51 approaches the submarine 48, a voltage is generated in coil 19 different from that simultaneously generated in coil 21 whereby a gradient signal is set up by the gradiometer device sufficient to operate a suitable electroresponsive firing device 53 and thus detonate the missile 51.

Although theoretically no output signal should appear at the terminals 23 and 24 while the gradiometer device 11 is moved or rotated in a uniform magnetic field, in practice this result is realizable only by the use of the balancing devices hereinabove mentioned. It has been found that in the absence of these balancing and corrector devices, such factors as lack of alignment of the magnetic axes of the coils, unequal pickup power of the coils, core and environmental asymmetry, eddy-currents, missile motion, result in unsatisfactory operation of the gradiometer device 11 as a magnetic influence initiator.

The normal motion of an underwater missile, such as translational and rotational movements, are such as are confined to the region of approximately one cps, or less. Capacitor 25 is provided to render the gradiometer unit 11 insensitive to flux linkage variations of the order of the low motional frequency thereby insuring the gradiometer's ability to differentiate between motional variations in the uniform magnetic field of the earth and the non-uniform field resulting from target proximity, and to insure response only to the latter. Capacitor 25 also serves to filter out any high frequency noise which may be present.

To insure equal pick-up power of the coils 19 and 21, screw 37 is employed to make the effective magnetic length of the adjustable end of the core 22 equal to the non-adjustable end. By selectively varying the effective magnetic length of the core 22, the number of flux linkages cutting across the pick up coils 19 and 21 can be made equal to one another. Although the screw 37 will effect an equal amplitude pick-up in the coils, an undesirable unbalance may still exist in the pick-up power because of phase variations in the voltages induced in the coils due to differences in the eddy current paths coupled to the coils. Phase balancing copper discs 38 and 39 are provided to insure voltage phase synchronization of the flux picked up by core 22 by varying the phase of the flux threading them, in response to the current induced in the discs. The adjustable phase control disc 38 is such as to enable substitution of varying dimensional discs, or of the addition of discs, or of slight displacement of the disc on the rod 22, until the phase of the voltage in the lower coil 21 equals that of the phase of the induced voltage in the upper coil 19. The phase displacement is caused by the effect of the flux developed by the eddy currents generated in the closed current loop of discs 38 and 39 upon the flux picked up by the core 22.

In order to compensate for any asymmetries in the warhead 12, or from a bent core 22, corrector 28 is bolted to the physical center of the core 22. By proper positioning of the gradiometer device 11 within the missile, the soft iron plates 33 of the corrector 28 will provide compensation for any magnetic asymmetry introduced by the ferromagnetic after portions of the missile 51 or from any bending in the core 22. It has been determined, empirically, that positioning corrector 28 in the forward position as shown in Fig. 1, produces the most desirable asymmetric results. Additionally the number of plates 33 may be varied to assist in producing the desired compensating effect. The copper member 29 like the copper discs 38 and 39 functions as a closed current conducting path and provides a fine asymmetry adjustment by shifting the phase of the magnetic flux from the corrector 28 to be in synchronism with that arising from the after portion ferromagnetic components. In view of the use of the non-magnetic warhead 12 in place of a magnetic material head, the criticalness of the magnetic flux phase corrector has been greatly reduced. Balancing adjustments can be effected through ports 54 formed in the warhead 12, upon removal of cover plates 55.

Briefly stated, in summary, the invention provides a gradiometer arrangement adapted to measure small gradients in magnetic fields resulting from the presence of magnetic objects irrespective of the motion of the device in a uniform magnetic field. Furthermore, this invention provides individually adjustable means which concertedly provide for a high degree of magnetic balance within the gradiometer whereby in the absence of a disturbance in a uniform magnetic field no electrical potentials are generated by the gradiometer.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a gradiometer device for detecting disturbances in a magnetic field, the combination of a magnetic rod arranged within said magnetic field and adapted to pick up a quantity of magnetic flux from said field, a pair of output terminals, a pair of opposedly and serially connected induction coils connected to said terminals, each of said coils being disposed on end portion of said rod respectively, for applying to said pair of terminals electrical signals generated in response to the difference in the rate of change of magnetic flux within said rod as a disturbance of the magnetic field is detected by said device, means for selectively varying the length of said rod, and a capacitor connected across both of said coils and across said pair of terminals for rendering said induction coils frequency selective responsive.

2. In a gradiometer unit for detecting distortions in a uniform magnetic field, the combination of a magnetic core arranged within said magnetic field and adapted to pick up a quantity of magnetic flux from said field, a pair of output terminals, a pair of opposedly and serially connected coils connected to said terminals and disposed on either extremity of said core for applying to said pair of terminals electrical signals generated in response to the difference in the rate of change of magnetic flux within said core as a distortion in the uniform magnetic field is detected by said unit, adjustable means for selectively varying the length of said core, electrically conductive members mounted at the extremities of said core, a filter network connected across said opposedly connected coils for rendering said coils frequency selective responsive to a difference of a predetermined rate of change of magnetic flux, an apertured electrically conductive elongated member centrally mounted on said core intermediate said pairs of coils, and a preselected number of ferromagnetic plates positioned within the aperture of said elongated member for compensating for asymmetries in the core.

3. In a gradiometer unit according to claim 2 wherein said adjustable means includes a threaded ferromagnetic rod adapted for movement within a complementary tapped receptacle formed at one end of said core thereby to vary the effective magnetic length of said core.

4. In a gradiometer unit according to claim 2 wherein said electrically conductive members include a fixed disc of ferromagnetic material secured on one extremity of said core, and an adjustable disc of ferromagnetic material positioned on the other extremity of said core for effecting phase synchronization of the magnetic flux picked up by said core throughout the entire length of said core.

5. A gradiometer unit for an underwater missile warhead comprising a core of magnetic material mounted within a warhead transverse to the horizontal axis thereof, said core being adapted to pick up a quantity of magnetic flux from an uniform magnetic field, a pair of output terminals, a pair of opposedly and serially connected induction coils connected to said terminals and disposed respectively on each extremity of said core for applying to said pair of terminals a potential signal generated in response to the difference in the rate of change of the magnetic flux within said core resulting from a disturbance in the uniform magnetic field, a capacitor connected across both of said coils and across said pair of terminals for rendering them frequency selective responsive, a bore axially formed in one end of said core, a ferromagnetic rod movably positioned in said recess for selectively varying the effective magnetic length of said core, a pair of copper discs respectively mounted about each extremity of said core, the mounting position of one disc being fixed and the other disc being adjustable to different positions on said core, an apertured copper block centrally affixed to said core in a preselected position relative to the warhead, and a preselected number of iron plates disposed within the aperture of said block, said rod, discs, block and plates providing means for magnetic balancing of the unit within an uniform magnetic field.

References Cited in the file of this patent

UNITED STATES PATENTS

| | | |
|---|---|---|
| 1,466,915 | Nichols | Sept. 4, 1923 |
| 2,431,319 | Ellwood | Nov. 25, 1947 |
| 2,598,467 | Van Yzeren | May 27, 1952 |
| 2,641,184 | Park | June 9, 1953 |
| 2,649,568 | Felch | Aug. 18, 1953 |
| 2,709,783 | Hare | May 31, 1955 |
| 2,743,415 | Williams | Apr. 24, 1956 |

FOREIGN PATENTS

| | | |
|---|---|---|
| 476,422 | Canada | Aug. 28, 1951 |